United States Patent
Garrett et al.

(10) Patent No.: US 11,926,739 B2
(45) Date of Patent: Mar. 12, 2024

(54) MODIFIED LIGNIN PRODUCTS FOR RIGID FOAMS

(71) Applicant: MCPU POLYMER ENGINEERING LLC, Corona, CA (US)

(72) Inventors: Thomas M. Garrett, Corona, CA (US); Swarup Kumar Maiti, Pittsburg, KS (US)

(73) Assignee: MCPU POLYMER ENGINEERING LLC, Corona, CA (US)

( * ) Notice: Subject to any disclaimer, the term of this patent is extended or adjusted under 35 U.S.C. 154(b) by 185 days.

(21) Appl. No.: 17/385,000

(22) Filed: Jul. 26, 2021

(65) Prior Publication Data
US 2023/0025729 A1    Jan. 26, 2023

(51) Int. Cl.
| | |
|---|---|
| C08L 97/00 | (2006.01) |
| C07G 1/00 | (2011.01) |
| C08G 18/12 | (2006.01) |
| C08G 18/18 | (2006.01) |
| C08G 18/42 | (2006.01) |
| C08G 18/48 | (2006.01) |
| C08G 18/64 | (2006.01) |
| C08G 18/76 | (2006.01) |
| C08G 101/00 | (2006.01) |
| C08H 7/00 | (2011.01) |
| C08J 9/14 | (2006.01) |
| C08K 3/22 | (2006.01) |
| C08K 3/30 | (2006.01) |
| C08K 3/32 | (2006.01) |
| C08K 5/00 | (2006.01) |
| C08K 5/521 | (2006.01) |

(52) U.S. Cl.
CPC .............. *C08L 97/005* (2013.01); *C07G 1/00* (2013.01); *C08G 18/12* (2013.01); *C08G 18/18* (2013.01); *C08G 18/4208* (2013.01); *C08G 18/4837* (2013.01); *C08G 18/6492* (2013.01); *C08G 18/7657* (2013.01); *C08H 6/00* (2013.01); *C08J 9/141* (2013.01); *C08K 3/22* (2013.01); *C08K 3/30* (2013.01); *C08K 3/32* (2013.01); *C08K 5/0066* (2013.01); *C08K 5/521* (2013.01); *C08G 2101/00* (2013.01); *C08G 2110/0025* (2021.01); *C08J 2201/026* (2013.01); *C08J 2203/14* (2013.01); *C08J 2205/10* (2013.01); *C08J 2375/06* (2013.01); *C08J 2375/12* (2013.01); *C08K 2003/2248* (2013.01); *C08K 2003/3045* (2013.01); *C08K 2003/321* (2013.01)

(58) Field of Classification Search
CPC ....................................................... C07G 1/00
See application file for complete search history.

(56) References Cited

U.S. PATENT DOCUMENTS

| | | | | |
|---|---|---|---|---|
| 3,718,639 | A | * 2/1973 | Falkehag | C08L 95/005 106/284.4 |
| 3,871,893 | A | * 3/1975 | Doughty | C08L 95/005 516/43 |
| 3,912,706 | A | * 10/1975 | Rachor | C02F 1/5263 527/403 |
| 3,952,068 | A | 4/1976 | Gipson | |
| 4,130,515 | A | * 12/1978 | Bornstein | C08G 16/0293 527/400 |
| 4,455,257 | A | * 6/1984 | Hoftiezer | C08H 6/00 530/501 |
| 4,562,236 | A | * 12/1985 | Lin | C08H 6/00 528/265 |
| 4,643,256 | A | 2/1987 | Dilgren | |
| 4,739,040 | A | * 4/1988 | Naae | C09K 8/584 530/502 |
| 4,789,523 | A | * 12/1988 | Schilling | C08H 6/00 422/12 |
| 5,110,487 | A | 5/1992 | Current | |
| 5,342,768 | A | 8/1994 | Pedersen | |
| 5,374,750 | A | 12/1994 | Nakamura | |

(Continued)

FOREIGN PATENT DOCUMENTS

| | | |
|---|---|---|
| EP | 2468239 B1 | 9/2013 |
| WO | 2004078815 A1 | 9/2004 |
| WO | 2015021541 A1 | 2/2015 |

OTHER PUBLICATIONS

Du et al. (Industrial Crops and Products, 52, 2014, 729-735) (Year: 2014).*
International Search Report and Written Opinion issued in App. No. PCT/US2022/038150, dated Nov. 29, 2022, 12 pages.
J. Liu et al., "Improving Aging Resistance and Mechanical Properties of Waterborne Polyurethanes Modified by Lignin Amines", J. Appl. Polym. Sci. 130 (2013) 1736.
Blank et al., "Catalysis of the Epoxy-Carboxyl Reaction", J. Coat. Technol. vol. 74, No. 926, Mar. 2002, 9 pages.

(Continued)

*Primary Examiner* — Liam J Heincer
(74) *Attorney, Agent, or Firm* — Dilworth IP, LLC

(57) ABSTRACT

Modified lignin products, processes for making them, and their use to produce rigid polyurethane or polyisocyanurate foams are disclosed. The processes comprise heating a lignin source with a nitrogen source and a starved concentration of a $C_1$-$C_5$ aldehyde to give a reaction mixture comprising a Mannich condensation product, neutralizing the reaction mixture, and isolating the modified lignin product. The process is performed at a mass ratio of lignin source to nitrogen source within the range of 1:1 to 1:5 and at a molar ratio of nitrogen source to $C_1$-$C_5$ aldehyde within the range of 3.5:1 to 1:1. Polyol blends and performance additives that contain the modified lignin products are described. Rigid foams that process well and incorporate up to 60 wt. %, based on the amount of polyol component, of the modified lignin contribute to excellent flame retardancy and low-temperature R-value performance.

12 Claims, 1 Drawing Sheet

(56) References Cited

U.S. PATENT DOCUMENTS

| | | | |
|---|---|---|---|
| 5,538,937 | A | 7/1996 | Hasebe |
| 6,395,694 | B1 | 5/2002 | Littau |
| 6,598,529 | B2 | 7/2003 | Tobias |
| 6,605,452 | B1 | 8/2003 | Basheer |
| 8,327,559 | B2 | 12/2012 | Berger |
| 8,735,640 | B2 | 5/2014 | Cohen |
| 9,187,712 | B2 | 11/2015 | Allen |
| 9,593,221 | B1 | 3/2017 | Kurple |
| 9,598,529 | B2 | 3/2017 | Langlois |
| 2002/0072288 | A1 | 6/2002 | Hei |
| 2011/0098384 | A1* | 4/2011 | Blount ............... C08G 18/6492 524/72 |
| 2012/0277349 | A1 | 11/2012 | Hsieh |
| 2013/0196853 | A1 | 8/2013 | Narayanan |
| 2014/0199551 | A1 | 7/2014 | Lewit |
| 2015/0315329 | A1 | 11/2015 | Garrett |
| 2017/0166733 | A1* | 6/2017 | Aurisicchio ............... C08L 9/06 |

OTHER PUBLICATIONS

O'Lenick, Jr. et al., "Effects of Branching upon Some Surfactant Properties of Sylfated Alcohols", JAOCS, vol. 73, No. 7, 1996, 3 pages.

Coope et al., "Metal Triflates as Catalytic Curing Agents in Self-Healing Fibre Reinforced Polymer Composite Materials", Macromol. Mater. Eng. 299, pp. 208-218, 2014, 11 pages.

Metzger et al., "Concepts on the contribution of chemistry to a sustainable development. Renewable raw materials", Comptes Rendus 7, pp. 569-581, 2004, 13 pages.

Rahman et al., "Synthesis and Properties of Waterborne Polyurethane (WBPU)/Modified Lignin Amine (MLA) Adhesive: A Promising Adhesive Material", Polymers 8, 318, 2016, doi:10/3390/polym8090318, 11 pages.

Alinejad et al., "Lignin-Based Polyurethanes: Opportunities for Bio-Based Foams, Elastomers, Coatings and Adhesives", Polymers 11, 1202, 2019, doi:103390/polym11071202, 21 pages.

Majka et al., "Layer-by-Layer Deposition of Copper and Phosphorus Compounds to Develop Flame-Retardant Polyamide 6/Montmorillonite Hybrid Composites", Appl. Sci. 10, 5007, 2020, doi:10.3390/app10145007, 20 pages.

Yue et al., "Impoved Interfacial Bonding of PVC/Wood-Flour Composites b y Lignin Amine Modification", BioResources 6(2), pp. 2022-2034, 2011, 13 pages.

Zhang et al., "Modification of Lignin and Its Application as Char Agent in Intumescent Flame-Retardant Poly(lactic acid)", Polymer Engineering and Science, 20112, doi:10.1002/pen.23214, 8 pages.

Ott et al., "Co-curing of epoxy resins with aminated lignins: insights into the role of lignin homo crosslinking during lignin amination on the elastic properties", https://doi.org/10.1515/hf-2020-0060, published online Aug. 24, 2020, 9 pages.

Mohammed Salem Ba Geri, "Investigating the performance of high viscosity friction reducers used for proppant transport during hydraulic fracturing", Doctoral Dissertations, 2827, 2019, https://scholarsmine.mst.edu/doctoral_dissertations/2827.

Jiao et al., "Amination of biorefinery technical lignin by Mannich reaction for preparing highly efficient nitrogen fertilizer", International Journal of Biological Macromolecules 127, 2019, pp. 544-554.

Ning-Cheng Lee, "Reflow Soldering Processes and Troubleshooting: SMT, BGA, CSP and Flip Chip Technologies", 2002, 273 pages.

* cited by examiner

MODIFIED LIGNIN PRODUCTS FOR RIGID FOAMS

FIELD OF THE INVENTION

The invention relates to modified lignin products, processes for preparing them, and polyurethane or polyisocyanurate rigid foams and other products that include the modified lignins.

BACKGROUND OF THE INVENTION

Rigid polyurethane and polyisocyanurate foams are used in a wide range of applications including construction, automotive, refrigeration appliances, board stock, sandwich panels and other products due to their excellent insulating and mechanical properties. Rigid foams have long been made mostly from petrochemical-based polyols and other non-sustainable raw materials. Although polyols based on natural oils are otherwise desirable and have become more available in recent years, they have not replaced traditional polyols because of a reputation for high cost, batch-to-batch inconsistency, poor performance, and/or a need to completely reformulate an already-commercial product.

Lignin is second only to cellulose as the most abundant natural material on planet Earth. With its three-dimensional structure and a wide range of phenolic, aldehyde, hydroxyl, alkoxy, and other functionalities, lignin is the "glue" that binds cellulose fibers to impart rigidity in trees and other plant material. Despite lignin's ubiquity, thousands of scientific papers, and an appreciation by the industry that lignin-based products might offer performance advantages for some kinds of polyurethane products (including thermal stability and/or flame resistance), formulators of rigid foams continue to rely principally on fossil-fuel based polyols.

Although unmodified lignin can be included directly in a foam formulation, its sulfur content, high glass-transition temperature, poor solubility, high polydispersity, and low reactivity with polyisocyanates cause inconsistent performance, incomplete incorporation into the polymer matrix, and correspondingly inferior foam quality. Therefore, use of unmodified lignin as an additive has limited utility. These problems are summarized in Table 1 of an excellent review article by M. Alinejad et al. (*Polymers* 11 (2019) 1202).

At times, lignin has been chemically modified to improve its workability for various polymer systems and other applications. For instance, G-J. Jiao et al. (*Internat. J. Biol. Macromol.* 127 (2019) 544) use Mannich chemistry to modify lignin for more efficient use in fertilizers. R. Zhang et al. (*Polym. Enq. Sci.* 52 (2012) 2620) describe the use of urea-modified lignin (also made using a Mannich reaction) as a char-forming agent for poly(lactic acid). J. Liu et al. (*J. Appl. Polym. Sci.* 130 (2013) 1736) modify properties of waterborne polyurethanes using lignin amines made via the Mannich reaction with diethylenetriamine. U.S. Pat. No. 6,598,529 describes a way to make PIR foam boards using pre-reacted lignin and polyisocyanates.

Derivatization approaches to improving the reactivity of lignin toward polyisocyanates have included alkoxylation with epoxides, hydroxyalkylation with cyclic carbonates, methylolation of aromatic rings with formaldehyde, demethylation of methyl ethers, or other methods (see Alinejad, supra, at FIG. 4). Although alkoxylation improves lignin reactivity with polyisocyanates, it requires considerable expertise and engineering controls to handle the typically large proportion of ethylene oxide and/or propylene oxide under pressure at elevated temperatures and defeats the purpose of using a sustainable raw material. Moreover, the alkoxylated lignins still lack a desirable degree of solubility and compatibility with other components of a rigid foam, so designing a well-balanced formulation that processes well and gives rigid foam with acceptable properties has proved elusive.

Lignin has potential advantages for improving flammability characteristics of rigid foams. Currently, chlorinated flame retardants such as tris(2-chloroisopropyl)phosphate (TCPP) are used to achieve acceptable fire retardancy (FR). However, many halogenated flame retardants are subject to increasingly strict regulatory restrictions, and TCPP is gradually being replaced by less-toxic (albeit somewhat less effective) alternatives that include trialkylphosphates, e.g., trioctylphosphate (TOP). Desirably, modified lignins could be identified that, when used in combination with trialkylphosophates, could deliver rigid foams with superior FR performance.

In sum, challenges remain in identifying and producing lignin-based materials that are economical, sustainable, and offer performance advantages for rigid polyurethane and polyisocyanurate foams. The industry would benefit from the availability of improved modified lignin products. A desirable modified lignin product for rigid foam formulations would be inexpensive to produce from readily available reagents and lignin sources that vary in composition. The modified lignin would have good solubility, low viscosity, and high reactivity with polyisocyanates rivaling that of the commonly used aromatic polyester polyols so that its proportion could vary considerably without negatively impacting reactivity or foam properties. Ideally, the resulting foams could include a substantial proportion of lignin (30 to 60 wt. % or higher based on polyol content) to make a meaningful impact on flammability properties and sustainability.

SUMMARY OF THE INVENTION

In one aspect, the invention relates to a process for making a modified lignin product. The process comprises heating a lignin source with a nitrogen source and a starved concentration of a $C_1$-$C_5$ aldehyde to give a reaction mixture comprising a Mannich condensation product, neutralizing the reaction mixture, and isolating a modified lignin product. The lignin source, the nitrogen source, and the $C_1$-$C_5$ aldehyde, especially formaldehyde, are heated in the presence of an acidic or basic catalyst at a mass ratio of lignin source to nitrogen source within the range of 1:1 to 1:5 and at a molar ratio of nitrogen source to $C_1$-$C_5$ aldehyde within the range of 3.5:1 to 1:1.

In some aspects, the modified lignin product is isolated after a filtration process ("waste-generating" process); in others, the modified lignin product and any side products are simply concentrated ("zero-waste" process). In some aspects, the invention includes modified lignin products made by these processes.

The invention includes performance additives. The additives comprise: (a) a phosphorus-based flame retardant, a natural oil polyol, or a combination thereof; and (b) 10 to 90 wt. %, based on the amount of performance additive, of a modified lignin product.

In other aspects, the invention relates to polyol blends. The blends comprise 20 to 80 wt. % of an aromatic polyester polyol, 5 to 30 wt. % of a glycol, optionally, 5 to 30 wt. % of a natural oil polyol, and 10 to 60 wt. % of a modified lignin product.

In other aspects, the invention includes a rigid polyurethane (PU) or polyisocyanurate (PIR) foam comprising a reaction product of an aromatic polyester polyol, a glycol, a polyisocyanate, a urethane catalyst, a foam-stabilizing surfactant, a blowing agent, and a modified lignin product as described above.

The invention also includes rigid foams comprising a reaction product of an aromatic polyester polyol, a glycol, a polyisocyanate, a urethane catalyst, a foam-stabilizing surfactant, a blowing agent, and the performance additives or the polyol blends described above.

The modified lignin products, especially urea-modified lignins, have low viscosity and are versatile, sustainable, and easy to manufacture from diverse lignin sources and inexpensive reagents. The modified lignins boast polyol-like reactivity, which makes them "drop in" replacements for up to 60 wt. % of the polyol components of rigid PU/PIR foams while maintaining excellent processing character and foam properties, including improved flame retardancy and low-temperature R-value performance. When combined with a non-halogenated fire retardant, the modified lignins deliver excellent flame retardancy while avoiding the need for less-friendly alternatives.

DETAILED DESCRIPTION OF THE INVENTION

1. Process

Figure 1:
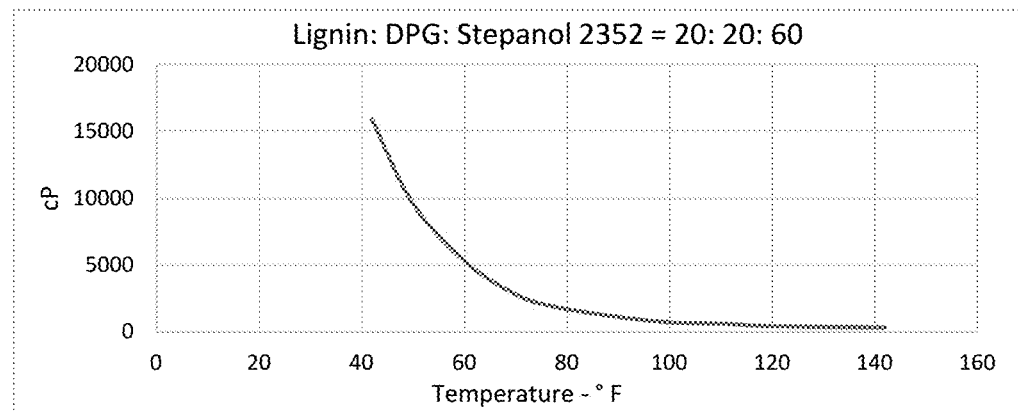
FIG. 1 shows a viscosity (cP) versus temperature (° F.) plot for a mixture of 60 wt. % of an aromatic polyester polyol (STEPANPOL® 2352) with 20 wt. % of dipropylene glycol and 20 wt. % of a urea-modified lignin.

In some aspects, the invention relates to a process for making a modified lignin product using a Mannich reaction. In a first step, a lignin source and a nitrogen source are heated in the presence of a starved concentration of a $C_1$-$C_5$ aldehyde, preferably formaldehyde, in the presence of an acidic or basic catalyst, preferably a basic catalyst, under conditions effective to give the Mannich product while minimizing side products.

Lignin Source

Lignin occurs naturally and is abundant in many forms. Suitable lignin sources include softwood kraft lignins, hardwood kraft lignins, lignosulfonates, organosolv lignins, steam-explosion lignins, bagasse, non-wood cellulosic biomass, other natural waste materials containing enolizable hydrogen atoms, and their combinations. Preferred lignins are softwood kraft lignins. Preferably, the lignin component is separated from cellulosic components prior to use. Surprisingly, although lignins vary considerably in composition depending on the source (and even from batch-to-batch from a single supplier), we found that softwood kraft lignins obtained from multiple suppliers can be modified and used successfully in the manufacture of rigid foams. Suitable lignins include, for instance, softwood kraft lignins available from Domtar, Suzano, Ingevity (Indulin AT lignin), and other suppliers. In some aspects, the reactivity of the lignin is augmented by "phenolation," i.e., by reacting the lignin source with phenol in the presence of a mineral acid as described, e.g., in G-J Jiao, *Internat. J. Biol. Macromol.* 127 (2019) 544; phenolating the lignin increases the concentration of phenolic rings available for reaction with the nitrogen source and the aldehyde.

Nitrogen Source

The nitrogen source is generally ammonia or any amine or amide capable of reacting with a $C_1$-$C_5$ aldehyde to form a complex that can alkylate a phenolic ring on a lignin source and also impart to the modified lignin one or more active hydrogen atoms (e.g., an —OH, —NH, or —$NH_2$ group). Suitable amines are primary and secondary alkylamines, hydroxylamines (ethanolamine, diethanolamine, N-methylethanolamine), diamines, polyamines, and the like. Preferred amides are formamide, acetamide, and especially urea. Although urea is a well-known, readily available, and inexpensive nitrogen source for Mannich reactions, we found that urea-modified lignins, particularly those made using urea and formaldehyde, are surprisingly "polyol-like" in their reactivity and performance when used to make rigid polyurethane or polyisocyanurate foams.

The relative amounts of lignin source and nitrogen source used in the process for making the modified lignin product can vary depending on the nature of the lignin source, the nature and proportion of the nitrogen source, the proportion of $C_1$-$C_5$ aldehyde used, concentration of reactants, and other factors within the skilled person's discretion. Generally, the mass ratio of the lignin source to the nitrogen source will be within the range of 1:1 to 1:5, from 1:1.2 to 1:3, or from 1:1.5 to 1:2.5.

$C_1$-$C_5$ Aldehyde

A $C_1$-$C_5$ aldehyde is used in the process. Suitable $C_1$-$C_5$ aldehydes include formaldehyde, acetaldehyde, propionaldehyde, n-butyraldehyde, isobutyraldehyde, n-valeraldehyde, pivaldehyde, and the like, and mixtures thereof. Formaldehyde (commercially available as "formalin," a 37% solution of formaldehyde in water) is preferably used as the $C_1$-$C_5$ aldehyde. Formaldehyde is inexpensive, reacts rapidly, and provides modified lignins in high yield.

The lignin source and the nitrogen source are heated with a "starved concentration" of the $C_1$-$C_5$ aldehyde, i.e., the $C_1$-$C_5$ aldehyde is introduced slowly to maintain a very low concentration of unreacted $C_1$-$C_5$ aldehyde. This helps to minimize evaporative losses of the aldehyde, maximize phenolic ring alkylation, and minimize generation of an undesirable level of urea-aldehyde condensation by-products.

In some aspects, the molar ratio of the nitrogen source to $C_1$-$C_5$ aldehyde, preferably formaldehyde, is within the range of 3.5:1 to 1:1, from 2.5:1 to 1:1, or from 1.5:1 to 1:1.

In a preferred aspect, the mass ratio of lignin source to nitrogen source (preferably urea) to aldehyde (preferably formaldehyde) is about 1.0 to about 1.2 to about 0.56.

Reaction Conditions

The process for making the modified lignin product is performed in the presence of an acidic or basic catalyst, preferably a basic catalyst. Suitable acidic catalysts include mineral acids, organic acids, Lewis acids, or the like. Suitable basic catalysts include alkali metal hydroxides, alkaline earth metal hydroxides (e.g., calcium hydroxide), alkaline earth metal oxides, and the like. Alkali metal hydroxides (NaOH, KOH, LiOH) are preferred basic catalysts. Basic catalysts are generally preferred because lignins are more easily solubilized under basic conditions.

The reactants are heated to a desired reaction temperature, which is not critical. In some aspects, the process is performed at temperatures within the range of 40° C. to 130° C., or 50° C. to 100° C., or 60° C. to 90° C.

The reaction is allowed to proceed to the desired level of completion. Typically, the reaction is considered complete within 24 hours, or in some aspects, within 8 hours, or in other aspects, within 4 hours.

In general, the "zero waste" process, described in more detail below, is performed with a smaller excess of the nitrogen source and a more dilute reaction mixture when compared with the "waste-generating" process. Together with the slow addition of the $C_1$-$C_5$ aldehyde and an extended reaction time, the conditions help to maintain a homogeneous reaction mixture and minimize evaporative loss of the aldehyde, especially when formaldehyde is used. Consequently, the "zero waste" process can selectively proceed to a high degree of conversion when compared with the "waste-generating" process.

Neutralization

When the reaction is considered complete, the reaction mixture is typically diluted with water, and a base or an acid (as appropriate) is added to neutralize the mixture. For instance, when the reaction is catalyzed by aqueous NaOH, the reaction mixture is typically diluted with water and neutralized with glacial acetic acid, hydrochloric acid, or the like.

Isolation of the Mannich Condensation Product

The modified lignin product is insoluble in water and many solvents. Following neutralization, the mixture can be further diluted with water if desired to ensure complete precipitation of the modified lignin product. In some aspects, the aqueous mixture is filtered to isolate the modified lignin as a solid product. The isolated solid product can be washed with water or a combination of water and an organic solvent if desired. Filtering the heterogeneous mixture generates an aqueous waste stream that is usually discarded. This kind of process is referred to herein as a "waste-generating" process.

Alternatively, the reaction product, following neutralization and any further dilution with water is simply concentrated by evaporation, vacuum stripping, or other techniques to isolate the modified lignin product. Because the mass balance of the original reactants is retained in practically quantitative manner (aside from removal of water generated in the condensation reaction), this way of isolating the reaction product is referred to herein as a "zero-waste" process. When the zero-waste process is used, it is preferred to use a minimum amount of the nitrogen source.

The modified lignin product made by the zero-waste process presumably concentrates side products (e.g., urea-aldehyde resins, other condensation products, and unreacted starting materials) in the modified lignin product. The amount of isolated material from the zero-waste process typically exceeds 95% of originally charged reactants (see Table 2, examples using General Method 3) compared with less than 70% for the waste-generating process, although the nature of the product made by the zero-waste process is difficult to fully characterize. Surprisingly, however, modified lignin made by the zero-waste process outperforms similar modified lignin products made using the waste-generating process in imparting flame retardancy to rigid PU and PIR foams made from the modified lignin products (compare the mass loss % values in Table 11, entry 1 versus Table 8, entry 1).

2. Performance Additives

The invention includes performance additives comprising: (a) a phosphorus-based flame retardant, a natural oil polyol, or a combination thereof; and (b) 10 to 90 wt. %, based on the amount of performance additive, of a modified lignin product prepared as described above. In some aspects, the modified lignin is present at 25 to 85 wt. % based on the amount of performance additive.

Suitable phosphorus-based flame retardants are well known and commercially available. Halogenated phosphorus-based flame retardants such as tris(2-chloroisopropyl) phosphate (TCPP) are highly effective for reducing flammability of rigid PU and PIR foams, but they are under considerable regulatory pressure and are less preferred. More preferred are non-halogenated phosphorus-based flame retardants, especially trialkyl phosphates such as trimethylphosphate, triethylphosphate, tri-n-butylphosphate, and trioctylphosphate (TOP). When present, the phosphorus-based flame retardant is typically used in an amount within the range of 10 to 90 wt. %, 15 to 75 wt. %, or 20 to 70 wt. %, based on the amount of performance additive.

Suitable natural oil polyols are made by incorporating active hydrogen functionality into natural oils. Some natural oil polyols are made, for example, by epoxidizing carbon-carbon double bonds of an oil, followed by a ring-opening reaction to generate hydroxyl functionality. Commercially available natural oil polyols include, e.g., EMEROX® polyols from Emery Oleochemicals, BIOH® polyols from Cargill, SOVERMOL® or PLURACOL Balance® polyols from BASF, and HONEY BEE™ reactive additives from MCPU Polymer Engineering. Some HONEY BEE™ reactive additives are produced in two steps involving hydrohalogenation of an unsaturated triglyceride followed by reaction of the resulting halide with diethanolamine to introduce hydroxyl functionality (see, e.g., U.S. Publ. No. 2015/0315329). When present, the natural oil polyol is typically used in an amount within the range of 10 to 90 wt. %, 15 to 75 wt. %, or 20 to 70 wt. %, based on the amount of performance additive. In a preferred aspect, the natural oil polyol is a HONEY BEE™ reactive additive having a hydroxyl number within the range of 200 to 550 mg KOH/g, such as HB-230, HB-395, HB-530, or their mixtures. HB-230, HB-395, or their mixtures are preferred.

In addition to the phosphorus-based flame retardant and/or the natural oil polyol, the performance additive comprises 10 to 90 wt. %, 25 to 85 wt. %, or 30 to 80 wt. %, or 40 to 60 wt. %, based on the amount of performance additive, of a modified lignin product prepared as described above.

In some aspects, the performance additive further comprises a nonionic surfactant, which can help to improve component adhesion and reduce foam friability. Suitable nonionic surfactants are well known and include, for example, alkylphenol ethoxylates, castor oil ethoxylates, fatty amine ethoxylates, sorbitol ester ethoxylates, alkanolamide ethoxylates, fatty alcohol ethoxylates, block EO/PO copolymers, fatty acid ethoxylates, and the like. Alkylphenol ethoxylates, particularly those having linear or branched $C_8$-$C_{12}$ alkyl groups, such as nonylphenol ethoxylates and decylphenol ethoxylates, are preferred. Suitable nonionic surfactants are commercially available from Stepan Company, BASF, and other suppliers.

In some aspects, the performance additive includes a copper compound, which can help with char formation and flammability reduction in foams. Suitable copper compounds are oxides, sulfates, and other salts. Examples include copper(I) oxide, copper(II) sulfate, copper(II) phosphate, and the like, and combinations thereof. The amount of copper compound included is not critical. Typically, the amount used will be within the range of 0.1 to 1 mmol of Cu per gram of the modified lignin product, or from 0.2 to 0.8 mmol of Cu per gram of the modified lignin product.

3. Polyol Blends

The invention includes polyol blends. The blends comprise an aromatic polyester polyol, a glycol, optionally a natural oil polyol, and a modified lignin product as described earlier.

The polyol blends comprise 20 to 80 wt. %, 30 to 70 wt. %, or 40 to 60 wt. %, based on the amount of polyol blend, of one or more aromatic polyester polyols. Aromatic polyester polyols are well-known reaction products of an aromatic dicarboxylic acid or anhydride (e.g., terephthalic acid, phthalic anhydride) and a diol (e.g., propylene glycol, diethylene glycol). The targeted average hydroxyl functionality of the aromatic polyester polyol is typically within the range of 1.8 to 3.0, or from 1.9 to 2.5, or from 1.9 to 2.1. Desirable aromatic polyols will have hydroxyl numbers within the range of 230 to 400 mg KOH/g, from 250 to 350 mg KOH/g, or from 300 to 350 mg KOH/g. Suitable aromatic polyols are commercially available from Stepan Company (e.g., STEPANPOL® P2352, STEPANPOL® 2412, STEPANPOL® 2452, STEPANPOL® PS-2520, STEPANPOL® 2602, STEPANPOL® PS-3021), Huntsman (TEROL® 250, TEROL® 305, TEROL® 649), Coim (ISOEXTER® TB-305, ISOEXTER® TB-306), and other suppliers.

In addition to the aromatic polyester polyol, the polyol blends can include other varieties of polyols, including polyether polyols (amine-initiated polyols, sucrose-initiated polyols, sucrose-amine polyols, halogenated polyether polyols, polyethylene glycols, reactive polyols, polymer polyols), Mannich polyols, acrylic polyols, phosphorus-containing polyols and the like.

The polyol blends include 5 to 30 wt. % or 10 to 25 wt. %, based on the amount of polyol blend, of a glycol. Suitable "glycols" are linear, branched, or cyclic, and have 2 to 4 hydroxyl groups. Examples include ethylene glycol, propylene glycol, diethylene glycol, dipropylene glycol, triethylene glycol, tripropylene glycol, 1,3-propanediol, 1,2-butylene glycol, 1,3-butanediol, 1,4-butanediol, 2-methyl-1,3-propanediol, neopentyl glycol, glycerol, trimethylolpropane, polyethylene glycols having number-average molecular weights of 1000 g/mol or less, especially PEG-200, PEG-300, PEG-400, and the like, and combinations thereof. Preferred glycols are free-flowing liquids at room temperature. Diethylene glycol, dipropylene glycol, PEG-300, and PEG-400 are particularly preferred.

The polyol blends optionally include 5 to 30 wt. %, or 10 to 20 wt. %, based on the amount of polyol blend, of a natural oil polyol as described earlier. In a preferred aspect, the natural oil polyol is a HONEY BEE™ reactive additive having a hydroxyl number within the range of 200 to 550 mg KOH/g, such as HB-230, HB-395, or HB-530.

The polyol blends comprise 10 to 60 wt. %, 20 to 50 wt. %, or 30 to 40 wt. %, based on the amount of polyol blend, of a modified lignin product as described previously.

The polyol blends desirably are easily poured and mixed with other liquid components, which facilitates their mixing with other B side components and their reaction with the polyisocyanate in a rigid foam formulation. In preferred aspects, the polyol blends have a Brookfield viscosity measured at 25° C. of less than 10,000 cP, less than 5000 cP, or less than 3000 cP. A preferred Brookfield viscosity range for the polyol blends is from 500 to 3000 cP 25° C. In one aspect, the glycol of the polyol blend is dipropylene glycol, and the blend has a Brookfield viscosity measured at 25° C. of less than 3000 cP.

In one aspect, the polyol blend is prepared by high-shear mixing of the modified lignin product, glycol, aromatic polyester polyol, and optional natural oil polyol at or about room temperature.

4. Rigid Foams

The invention includes rigid polyurethane (PU) or polyisocyanurate (PIR) foams. Commonly, both urethane and isocyanurate functionalities are found in these foams, which are principally used in insulating materials such as laminate board, metal panel board, or appliance insulation. The materials and processes used to manufacture rigid foams are generally well known. The foams are reaction products of an aromatic polyester polyol, a glycol, a polyisocyanate, a urethane catalyst, a foam-stabilizing surfactant, and a blowing agent. In some aspects, the formulations also include water and an amine catalyst. The inventive rigid foams include a modified lignin product as described herein.

Suitable aromatic polyester polyols and glycols have already been described.

Suitable polyisocyanates for use are well known, and many are commercially available from Huntsman (under the RUBINATE® and SUPRASEC® marks), BASF (LUPRANATE®), Evonik (VESTANAT®), Covestro (MONDUR®, BAYMIDUR®, and DESMODUR®), and other suppliers of polyurethane intermediates. Polyisocyanates suitable for use have average NCO functionalities within the range of 2.0 to 4.0. The polyisocyanate can be aromatic or aliphatic. Aromatic polyisocyanates include, e.g., toluene diisocyanates (TDI), naphthalene diisocyanates (NDI), 4,4'-diphenylmethane diisocyanates (MDI), or polymeric diisocyanates (p-MDI), or the like. Aliphatic polyisocyanates include, e.g., hexamethylene diisocyanate (HDI), hydrogenated MDI, cyclohexane diisocyanate (CHDI), isophorone diisocyanate (IPDI), trimethyl or tetramethylhexamethylene diisocyanate (TMXDI), or the like. Aromatic polyisocyanates, especially polymeric MDIs having NCO functionalities within the range of 2.7 to 3.5, are preferred. Suitable polymeric MDIs include, for instance, MONDUR® 489 (modified polymeric MDI, average NCO functionality=3.1, product of Covestro or LUPRANATE® M-20 (average NCO functionality=2.7), product of BASF. Mixtures of different polyisocyanates can be used. Dimerized and trimerized polyisocyanates can be used. In some aspects, aromatic polyisocyanates, e.g., p-MDI, are preferred.

Generally, the polyisocyanate is used in an amount effective to achieve a desired targeted NCO/OH index, typically from 200 to 350, or from 220 to 300, or from 230 to 290.

Suitable urethane catalysts include metals known to accelerate rapid curing and the formation of urethane linkages; some metal catalysts also promote isocyanate trimerization to form isocyanurates. Suitable metal catalysts comprise mercury, lead, tin, bismuth, potassium or tin. Examples include dibutyltin dilaurate, stannous octoate, and potassium octoate. Potassium octoate is preferred.

Tertiary amines ("blowing" catalysts) can be included to catalyze the reaction of water and polyisocyanates and promote crosslinking. Suitable examples include triethylenediamine (TEDA), N-benzyl-N,N-dimethylamine (BDMA), pentamethyldi-ethylenetriamine (PMDETA), dimethylcyclohexylamine (DMCHA), dimethylethanolamine (DMEA), triethanolamine (TEA), and mixtures thereof. PMDETA is preferred.

In some aspects, the foam formulation includes 0.1-0.6 pph (parts per hundred parts of polyol) of amine catalyst and 2-6 pph of metal catalyst. This combination is useful for producing polyisocyanurate (PIR) rigid foams.

Suitable blowing (foaming) agents include hydrocarbons (especially $C_5$ hydrocarbons), halogenated hydrocarbons, hydrochlorofluorocarbon (HCFC), hydrochlorocarbon (HCC), hydrofluorocarbon (HFC), hydrofluoroolefins (HFO), and methyl formate. Hydrocarbons, especially n-pentane or mixtures of n-pentane with isopentane or cyclopentane are preferred.

In some aspects, the rigid foam is produced using a modified lignin product that is isolated by concentrating rather than filtering the neutralized reaction mixture, i.e., according to the "zero waste" process.

In other aspects, the rigid foam comprises 10 to 60 wt. %, 15 to 50 wt. %, or 20 to 40 wt. %, based on the amount of polyol components, of the modified lignin product.

In some aspects, the rigid foam comprises a reaction product of an aromatic polyester polyol, a glycol, a polyisocyanate, a urethane catalyst, a foam-stabilizing surfactant, a blowing agent, and a performance additive as described above. In some aspects, this formulation also includes water and an amine catalyst.

In other aspects, the rigid foam comprises a reaction product of a polyisocyanate, a urethane catalyst, a foam-stabilizing surfactant, a blowing agent, and a polyol blend as described above. In some aspects, this formulation also includes water and an amine catalyst.

Although the modified lignin products are particularly valuable for making rigid polyurethane and polyisocyanurate foams, they can also be used to formulate other well-known kinds of polyurethane and other products, including flexible foams, molded foams, coatings, adhesives, binders, sealants, elastomers, thermoplastic urethanes, microcellular elastomers, RIM products, packaging materials, rigid boards, rigid blocks, and other products.

The following examples merely illustrate the inventive subject matter. Many similar variations within the scope of the claims will immediately be apparent to those skilled in the art.

TABLE 1

Reagents and vendors

| Reagents | Company | CAS/SDS/Product code # |
|---|---|---|
| STEPANPOL ® P2352 | Stepan Chemical Company: Northfield, IL, USA | |
| HONEY BEE™ additive (HB-230 or HB-395) | MCPU Polymer Engineering, LLC, Pittsburg, KS, USA | |
| Dipropylene glycol (DPG) | EMD Millipore Corporation, Billerica MA, USA | CAS-No: 25265-71-8 |
| Kraft lignins: Domtar Suzano (Ligseal 101) Indulin AT | Domtar, Plymouth, NC, USA Suzano SA, Estrada do Lageado, Brazil Ingevity Chemical, North Charleston, USA | CAS-No: 8068-05-1 |
| Nonylphenol ethoxylate (T-DET$^R$ N 9.5) | Harcos Chemicals Inc.: Kansas City, KS, USA | SDS: 320124-08 |
| Tris(2-chloroisopropyl)phosphate (TCPP) | Lanxess Corporation: Pittsburgh, PA, USA | |
| PEL-CAT ™ 9540-A (K-octoate, 76% in DEG) | Ele Corporation: Lyons, IL, USA | Product code: 99540-010 |
| Pentamethyldiethylenetriamine (PUMA 2020) | Sigma-Aldrich: St. Louis, MO, USA | CAS-No: 3030-47-5 |
| PEL-SIL ™ 1317 (Si-surfactant) | Ele Corporation: Lyons, IL, USA | Product code: 11317-000 |
| n-Pentane (98%) | Alfa Aesar: Ward Hill, MA, USA | CAS-No:109-66-0 |
| Iso-pentane (≥99%) | Sigma-Aldrich: St. Louis, MO, USA | CAS-No:78-78-4 |
| 2-methylbutane (≥99%) | Sigma-Aldrich: St. Louis, MO, USA | CAS-No:78-78-4 |
| Trioctyl phosphate | Alfa Aesar: Ward Hill, MA, USA | CAS-No: 78-42-2 |
| Copper sulfate, pentahydrate | Sigma-Aldrich: St. Louis, MO, USA | CAS-No: 7758-99-8 |
| Copper(I) oxide (97%) | Sigma-Aldrich: St. Louis, MO, USA | CAS-No: 1317-39-1 |
| Copper (II) phosphate (98%) | Alfa Aesar: Ward Hill, MA, USA | CAS-No: 7798-23-4 |
| Phosphoric acid (85% w/w aq. soln.) | Sigma-Aldrich: St. Louis, MO, USA | CAS-No:7664-38-2 |
| Urea (98+%) | Alfa Aesar: Ward Hill, MA, USA | CAS-No: 57-13-6 |
| Formaldehyde (37% w/w aq. soln.) | Alfa Aesar: Ward Hill, MA, USA | CAS-No: 50-00-0 |
| Potassium hydroxide (pellet) | Sigma-Aldrich: St. Louis, MO, USA | CAS-No: 1310-58-3 |
| MONDUR® 489 (Poly-isocyanate) | Covestro LLC: Pittsburgh, PA, USA | |
| Propylene carbonate (PC) | Sigma-Aldrich: St. Louis, MO, USA | CAS-No: 108-32-7 |
| Polyethylene glycol (PEG)-300 | EMD Millipore Corporation, Billerica MA, USA | CAS-No: 25322-68-3 |

TABLE 2

Parameters for Lignin Modification Processes

| Process type | Waste-generating process | | | | Zero-waste process | | |
|---|---|---|---|---|---|---|---|
| Lignin type | Domtar | | | | Domtar | Suzano | Indulin AT |
| General method # | 1 | | | 2 | 3 | 3 | 3 |
| Mass ratios of Lignin:Urea:HCHO (100%) | 1:2:0.74 | 1:1.5:0.56 | 1:1:0.37 | 1:1.5:0.56 | 1:1.17:0.56 | 1:1.17:0.56 | 1:1.17:0.56 |
| Wet lignin (dry) (g) | 43 (30) | 43 (30) | 43 (30) | 86 (60) | 86 (60) | 63 (60) | 63 (60) |
| KOH (g) | 1.32 | 1.32 | 1.32 | 2.65 | 2.65 | 2.65 | 2.65 |
| Water (g) | 60 | 60 | 60 | 160 | 220 | 270 | 320 |
| Urea (g) | 60 | 45 | 30 | 90 | 70 | 70 | 70 |
| HCHO (37% aq. soln.) (g) | 60 | 45.4 | 30 | 90.8 | 90.8 | 90.8 | 90.8 |
| Time of HCHO addition (h) | ~1 | ~1 | ~1 | ~1 | ~1 | ~1 | ~1 |
| Reaction temp. (° C.) | 80 | 80 | 80 | 80 | 80 | 80 | 80 |
| Acetic acid (g) | 3 | 3 | 3 | 4 | 3 | 3.2 | 3 |
| Time of reaction (h) | 2 | 2 | 2 | 1.75 | 4 | 7 | 4 |
| Average isolated yield (g) | 47.4 | 38.1 | 34.2 | 97.2 | 141.6 | 142.8 | 141 |
| Avg. isolated yield % (modified dry lignin) | 56.9 | 54.2 | 60.4 | 69.1 | 96.3 | 97.1 | 95.9 |

General Method 1

Preparation of Urea-Modified Lignin
(Waste-Generating Process)

Wet Domtar lignin (43 g, ~30% water content, 30 g of dry lignin equivalent) is mixed well in a beaker with 0.4 M aqueous KOH (60 g of solution, 1.32 g of KOH, 0.024 mmol). The mixture is transferred to a round-bottom flask and combined with a desired amount of urea (60.0, 45.4, or 30.0 g). The resulting solution is heated with stirring to 80° C. in an oil bath. The desired amount of formalin solution (~37% HCHO) is added dropwise over ~1 h at 8000. The amount of formaldehyde used provides mass ratios of lignin:urea:HCHO (considering 100%) equal to 1:2:0.74, 1:1.5:0.56, and 1:1:0.56, respectively. When the formaldehyde addition is complete, the solution stirs for an additional 1 h. Afterward, the solution is cooled to room temperature, diluted with water (150 g), and neutralized with glacial acetic acid (3.0 g, 0.54 mmol). The mixture is transferred to a plastic jar and diluted with water (600 g). After standing 3 h, the mixture is filtered under vacuum, and the isolated mass is air dried in an exhaust hood for 1 day, then heated in an oven (20 h at 105° C.). The average isolated yields of dry, modified lignin are reported in Table 2. The products are crushed and sieved to get a particle size≤0.053 mm. The sieved product is then used directly in making a rigid foam. In some cases, the modified lignin is gradually added to a preheated (~130° C.) polyol mixture and thermally treated at 130° C. for 1.5 h before using the polyol/lignin mixture to make a rigid foam.

General Method 2

Preparation of Urea-Modified Lignin
(Waste-Generating Process; Cu, P Addition)

The procedure of General Method 1 is generally repeated to make a modified lignin product on a 60-g (dry lignin equivalent) scale using a somewhat higher proportion of water (see Table 2 for reagent amounts). Average amount of isolated product: 69.1 g.

When copper modification is desired, the vacuum-filtered, modified lignin product is diluted with water (~400 g), and aqueous copper(II) sulfate pentahydrate solution (50 mL, 10 g or ~43 mmol of $CuSO_4 \cdot 5H_2O$) is added over 1 h at room temperature to the mechanically stirred mixture. In some experiments, the amount of copper(II) sulfate varies from 22 to 43 mmol.

Following Cu addition, any desired amount of phosphoric acid (e.g., 9.5 g of 85% aqueous solution) can be added to the copper-treated mixture and stirred for another 1 h. Thereafter, the viscous solution is filtered, air dried, oven dried, and sieved as described in General Method 1. When used, the amount of Cu in the modified lignin is typically 0.22-0.44 mmol/g of modified lignin. When used, the amount of phosphorus in the modified lignin is typically 0.84 mmol/g of modified lignin.

General Method 3

Preparation of Urea-Modified Lignin (Zero-Waste
Process)

The procedure of General Method 2 is generally followed with a few adjustments. First, the proportion of urea used is reduced, the amount of water used varies, and the reaction times are increased (see Table 2). In addition, the neutralized reaction product is not vacuum filtered. Instead, following neutralization with acetic acid, the entire reaction mixture is simply transferred to a few metal trays and is air dried in an exhaust hood overnight, followed by oven drying at 105° C. for 1 day. Average isolated yield of dry, modified lignin: 140 g.

Copper modification, phosphorus modification, or both can be performed as described in General Method 2; in the zero-waste process, however, the mixtures are simply concentrated following addition of Cu, phosphorus, or both, i.e., no filtration step is included.

General Method 4

Preparation of a Diethanolamine-Modified Lignin

The procedure of Example 1 is generally followed except that diethanolamine is used instead of urea and reagent amounts are modified. Thus, the Domtar lignin and aqueous KOH (60 g of 0.4 M solution) are combined, and diethanolamine (54 g) is added and heated to 80° C., followed by dropwise addition of formalin (98 g) over 1 h. The solution stirs for 2 h and is then cooled, acidified with glacial acetic acid (13 g), and filtered. The isolated solids are dried as described previously. Yield of modified lignin: 49.6 g.

Preparation of Polyisocyanurate Rigid Foams

A modified lignin/polyol blend, with or without a HONEY BEE™ reactive modifier, is added to a tared, wide-mouth jar, followed by water, amine catalyst, potassium octoate, tris(1-chloro-2-isopropyl)phosphate (TCPP), and surfactants (see Table 3 for amounts). These B-side components are mixed well mechanically at high speed for 30 s, then held at 76±2° F. for 2 h. Thereafter, pentane is added, and high-speed mixing resumes for 90 s. More pentane is added to compensate for evaporation, and mixing is performed for another 30 s. The B-side mixture is kept at 76±2° F. A desired amount of B-side mixture is transferred to a 16-oz plastic beaker. The desired proportion of MONDUR® 489 polymeric MDI (held at 76±2° F. for at least 2 h prior to use) is quickly added to the B-side blend and mixed well for 15 s at 3000 rpm. The well-mixed mixture is immediately poured into a pre-weighed, 83-oz paper bucket. Times relevant to the reactivity profile (cream, gel-string, and tack-free times) are determined and reported in accord with ASTM D7487-18. The resulting foams are held at room temperature for at least 24 h before being cut for physical testing.

"Polyol components" as used herein for rigid foams refers to the combined amounts of aromatic polyester polyol, modified lignin product, glycol, and HONEY BEE™ reactive additive. The "pph" values refer to parts per hundred parts of polyol component.

Physical Testing of PIR Foams

The foams are characterized by measuring core density, compressive strength, viscosity, and thermal resistivity (R), and by performing a burn test to understand flame retardant performance in terms of mass loss %. Details of the methods are given below.

Density

Specimens measuring 4" X 4" X 1" are cut from the core, and density is determined from the correct volume and weight of the specimen.

Compressive Strength

Samples used for the density measurement are tested for compressive strength. Compressive stress is determined at 10% deformation. Compressive strength is defined as the maximum stress up to the "breaking" strength. An in-house modification of ASTM D1621 is used.

Thermal Conductivity (K-Factor) or Resistivity (R-Value)

Thermal conductivity (K-factor) is tested on 6" x 6" x 1" specimens pre-conditioned for at least 24 h at 73±4° F. (23±2° C.) and 50±5% relative humidity. Thermal resistivity (R-values) of a few representative samples is measured at an external lab. Both values are determined according to ASTM C518-17.

Burn Test

A modification of the standard German flame test (DIN 4102-1) is used to determine flame retardant (FR) performance in terms of mass loss %. A lower mass loss % indicates better FR performance. At least 2 circular samples (diameter: 6-7"; thickness: 1") are tested, and an average value is reported.

Viscosity

Viscosity of mixtures of modified lignin and polyols are measured using a Brookfield viscometer. Results of the measurements appear in FIG. 1 and Table 9.

Results:

As shown in Table 3, the rigid foam formulations have B-side "polyol" components that include an aromatic polyester polyol, a HONEY BEE™ reactive additive, dipropylene glycol or PEG-300, and a modified lignin (from a Mannich reaction of lignin and urea or diethanolamine). The B-side also includes surfactants, catalysts, a flame retardant, water, and pentane (blowing agent). The A-side is polymeric MDI, which is used at a 260 NCO/OH index.

Ideally, the modified lignin will react with the polyisocyanate like the other polyol components. If its reactivity is too low, the modified lignin will incorporate only partially or not at all into the foam thereby hampering foam processing and generating a poor rigid foam. Too fast a reaction is also undesirable. Unmodified lignin is known to have relatively poor reactivity.

Table 4 shows reactivity profiles observed with 20 wt. % of three different lignin products modified by a Mannich reaction with urea. The proportion of kraft lignin (from Domtar), urea, and formaldehyde is varied as shown in Table 4. In these examples, a lignin-polyol mixture is heat-treated at 130° C. for 1-1.5 hours prior to its use in formulating the rigid foam. Generally, the reactivity is somewhat slower than desirable. The foam quality in these examples (not shown in Table 4) is also poorer than desirable, with some crown splitting, irregular cells, foam shrinkage, and friability observed. Entry 4, which includes 20 wt. % of HONEY BEE™ HB-230 and 10 pph of nonylphenol ethoxylate provides the highest reactivity (shortest gel-string and tack-free times) and best foam quality (finer cell structure, no crown splitting, less shrinkage) in this series. The result suggests that other foams based on the modified lignins could benefit from including a HONEY BEE™ reactive additive, a nonionic surfactant, or both.

Table 5 summarizes reactivity profiles observed with 20 wt. % of modified Domtar lignin products made in the same proportions as those shown in Table 4 but with no heat treatment of the polyol/modified lignin mixture; the modified lignin and other polyol components are simply combined and mixed well at room temperature. Surprisingly, the reactivity profiles are much improved. Moreover, when the reactivity profiles are compared with those of control foams made without 20 wt. % of the modified lignin, it is apparent that the modified lignin does not adversely affect reactivity; instead, it behaves-desirably-like the aromatic polyester polyol. Compare the reactivity profiles of the control at Table 7, entry 1 and the lignin-modified examples at Table 5, entries 1, 5, and 10. For this rigid foam formulation, reactivity appears optimal at a 1.0:1.5:0.56 weight ratio of lignin:urea:formaldehyde (Table 5, entries 5-9). Foam properties are also improved by the room-temperature combination of polyol and modified lignin. Based on visual inspection alone, the foams of Table 5 generally have fine structure, no crown splits, suitable hardness, reduced shrinkage, and reduced friability when compared with the foams of Table 4. A further improvement in reactivity is apparent when 20% of HONEY BEE™ HB-230 is included (Table 5, entries 7-9).

Although urea is readily available, inexpensive, and an ideal Mannich reactant, other amine- or amide-functional reactants can be used. As shown in Table 6, a modified lignin based on diethanolamine (DEA) delivers good reactivity and foam quality results, particularly when the proportion of DEA is adjusted (see, especially, entries 3 and 4).

Table 7 summarizes reactivity and foam property results of control experiments that include no modified lignin. Tested properties include compressive strength and flame retardancy (as reflected in mass loss % measured in accord with DIN 4102-1). Without modified lignin, a flame retardant, a HONEY BEE™ reactive additive, or added copper, the mass loss is about 55% (entry 1). Tris(2-chloroisopropyl) phosphate (TCPP) at 20 pph provides excellent flame retardancy (Table 7, entries 2, 3, and 6) despite the possible aging effect demonstrated in entry 3. However, as indicated earlier, TCPP has been banned in some jurisdictions and is being phased out in favor of nonhalogenated alternatives, such as trioctyl phosphate (TOP). One advantage of the modified lignins is their ability, particularly when combined with TOP and other additives, to achieve good flame retardancy while avoiding or minimizing reliance on TCPP. As Table 7 shows, without a modified lignin, including TOP alone reduces the mass loss from 55% to 29%, and further reductions in mass loss % can be achieved by combining TOP with copper or a combination of copper and a HONEY BEE™ reactive additive (entries 9 and 10).

Table 8 summarizes reactivity and foam properties observed with 20-40 wt. % (in the polyol component) of urea-modified Domtar lignin produced using the "waste-generating" process described in General Methods 1 and 2.

Entry 1 in Table 8 shows that mass loss is about 32% with 20 wt. % of urea-modified lignin content, or substantially less than the 55% mass loss observed when no modified lignin is included. The best overall fire retardancy is observed, not surprisingly, with TCPP (entries 2 and 5), but very good fire retardancy is also achieved when the urea-modified lignin is used in combination with TOP alone (entry 3) or TOP combined with a HONEY BEE™ reactive additive, with or without copper (see, e.g., entries 6, 10, 12, 13 and 16).

Table 8 also shows that the amount of urea-modified lignin can be boosted to 30 or 40 wt. % without sacrificing much reactivity (entries 7-10, 20, and 21). Interestingly, flame retardancy with 30 wt. % of the urea-modified lignin improves substantially from 40% to 20% mass loss when 20 pph of HONEY BEE™ reactive additive is included (compare entries 7 and 9); this may reflect the improved overall foam quality when the reactive additive is present.

Mixtures of polyols and modified lignins require reasonably low viscosity (less than or much less than about 10,000 cP at 25° C.) to facilitate their combination with other B-side components and rapid, complete mixing with the polyisocyanate. As Table 9 shows, a polyol mixture containing 20 wt. % of urea-modified lignin has a desirably low viscosity of about 1900 cP at 25° C. (77.3° F.).

Table 10 shows that low-temperature (25° F.) R-values of rigid foams can be improved with a combination of 20 wt. % urea-modified lignin in the polyol component when used with 20 pph of HONEY BEE™ reactive additive. Although it is unclear from the table whether a flame retardant additive is needed to generate an improved low-temperature R-value, a useful foam will, of course, include one or more FR additives.

Table 11 summarizes reactivity and foam properties observed with 20-60 wt. % (in the polyol component) of urea-modified Domtar lignin produced using the zero-waste process described in General Method 3. The formulations include 6-10 pph of nonylphenol ethoxylate surfactant, which is included to reduce friability and improve adhesion to the rigid foam surface.

Figure 2:
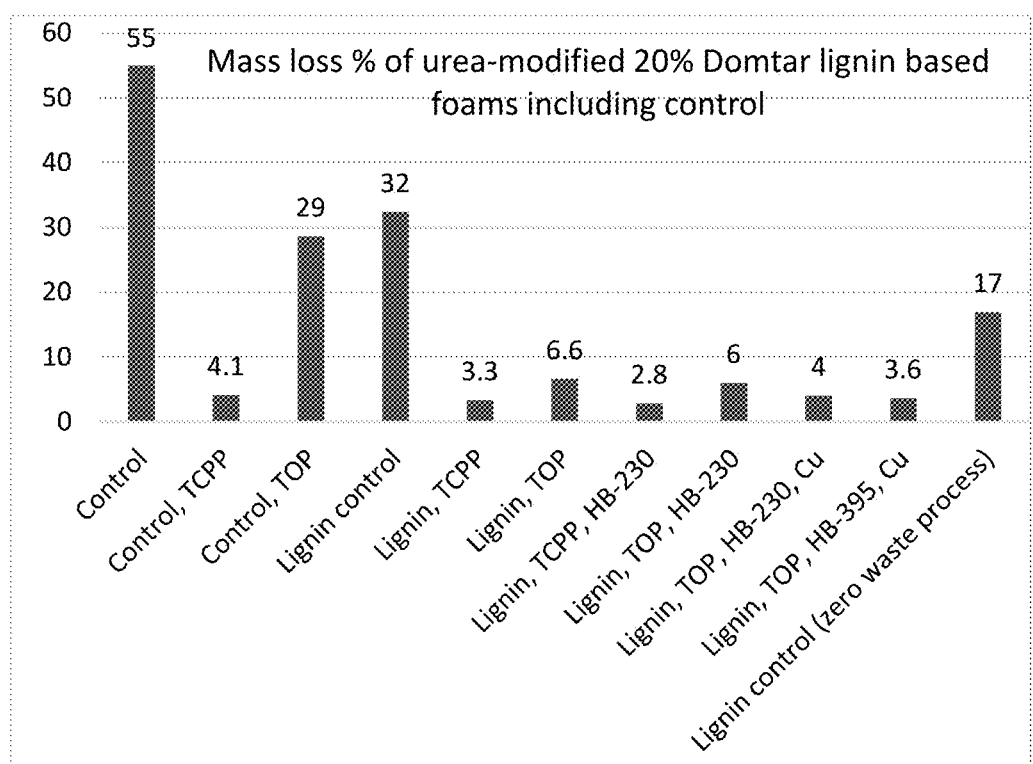
FIG. 2 plots mass loss % in a flame test (DIN 4102-1) for various rigid PIR foam samples produced with or without a urea-modified lignin and with or without other additives, including flame retardants (TCPP, TOP), HONEY BEE™ reactive additives, and copper compounds.

Entry 1 of Table 11 shows that 20 wt. % of urea-modified lignin prepared by the zero-waste process imparts substantial fire retardancy to the rigid foam; the mass loss is only 17%, or about half the value observed using the same amount of urea-modified lignin made by the waste-generating process (32%, Table 8, entry 1), and less than a third of the value observed in the control experiment with no modified lignin added (55%, Table 7, entry 1); see also the corresponding bars shown in FIG. 2. The 17% mass loss result in entry 1 of Table 11 from urea-modified lignin only also surpasses the flame retardancy improvement from adding 20 wt. % TOP to the same rigid foam instead of the urea-modified lignin (see Table 7, entry 4). It is unclear why the product of the zero-waste process imparts such enhanced flame retardancy.

The results in Table 11 also illustrate that 60 wt. % (60 parts per hundred parts of polyol) of urea-modified lignin can be incorporated into the rigid foam while maintaining reasonable reactivity. As the low compressive strength in entry 9 indicates, friability of the foam can become an issue at high lignin loadings. Inclusion of TOP with the urea-modified lignin can further reduce flammability (entry 11). In some cases, FR properties might be further improved with Cu, a HONEY BEE™ reactive additive, or both.

"Lignin" refers to many different varieties of available materials obtained from diverse natural sources. It is therefore far from clear that lignin obtained from different sources and modified using Mannich chemistry would be suitable for use as a B-side component of a rigid polyurethane or polyisocyanurate foam. Nevertheless, as shown in Table 12, lignin obtained from Suzano and modified with lignin using the zero-waste process performs well in making rigid foams. Excellent flame retardancy results are demonstrated using a combination of the urea-modified lignin with TOP or TOP with a HONEY BEE™ reactive additive, with or without copper (see, e.g., entries 12, 17, 19, and 20.

Similar trends are seen with urea-modified Indulin AT lignin made using the zero-waste process (see Table 13).

Table 14 summarizes the results of additional experiments with Indulin AT lignin. As shown in the table, adding 20 pph of urea-modified lignin has a positive impact on flame retardance (mass loss 34% versus 59% for entry 3 versus entry 1), but including a HONEY BEE™ reactive additive and trimethyphosphate (TMP) provides superior performance (mass loss 3.0% or 3.6%) even when compared with TCPP (entry 2, 10% mass loss). Interestingly, the low-temperature (e.g., 25° F., 40° F.) R-values are also improved by the combination of urea-modified lignin, TMP, and a HONEY BEE™ reactive additive.

In sum, urea-modified lignins made by either the waste-generating or zero-waste processes are valuable reactants with polyol-like reactivity for making rigid foams with improved FR properties. Surprisingly, the zero-waste process gives a urea-modified lignin that outperforms the product made in the waste generating process and also outperforms a similar level of TOP, a well-known flame retardant, in flammability tests on rigid foams made with these materials. Up to 60 wt. %, based on the amount of polyol, can be successfully incorporated into the formulation while maintaining good reactivity and acceptable foam properties. Additional enhancements in FR properties and low-temperature R-values can be achieved by combining the urea-modified lignins with trialkyl phosphates, HONEY BEE™ reactive additives, copper, or their combinations. The combinations offer an environmentally attractive alternative to rigid foams that include TCPP as a fire retardant.

TABLE 3

Rigid Foam Formulations

| Materials | pph |
|---|---|
| B-side | |
| Polyol components | |
| STEPANPOL ® P2352 (aromatic polyester polyol, Stepan Company) | 20-80 |
| HONEY BEE ™ reactive additive (HB-230 or HB-395, MCPU Polymer Engineering) | 0 or 20 |
| urea-modified lignin or diethanolamine-modified lignin | 20-60 |
| dipropylene glycol (DPG) or PEG-300 | 20 |
| Total polyol | 100 |
| nonylphenol ethoxylate (NPE) | 0-10 |
| tris(2-chloroisopropyl)phosphate (TCPP) or trioctyl phosphate (TOP) | 0-20 |
| PEL-CAT ™ 9540-A (potassium octoate catalyst, Ele Corp.) | 4 |
| PUMA 2020 (pentamethyldiethylene triamine catalyst) | 0.20 |
| PEL-SIL ™ 1317 (silicone surfactant, Elé Corp.) | 4.4 |
| water | 0.14 |
| n-pentane | 25 |
| A-side | |
| MONDUR ® 489 (polymeric MDI, Covestro) | 260 index |

Polyol + HONEY BEE ™ reactive additive + DPG + urea-modified lignin = 100 pph

TABLE 4

Reactivity Profile:
Urea-modified Domtar Lignin (20 wt. %)
(lignin-polyol mixture prepared at 130° C.)

| Entry | HB-230, % | NPE, pph | lignin:urea:HCHO wt. ratio | Cream time, s | Gel-string time, s | Tack-free time, s |
|---|---|---|---|---|---|---|
| 1 | | | 1.0:2.0:0.74 | 22 | 100 | 160 |
| 2 | | 10 | | 21 | 101 | 150 |
| 3 | 20 | | | 22 | 108 | 130 |
| 4 | 20 | 10 | | 21 | 70 | 124 |
| 5 | | | 1.0:1.5:0.56 | 22 | 78 | 176 |
| 6 | | 10 | | 22 | 75 | 172 |
| 7 | | | 1.0:1.0:0.37 | 29 | 120 | 380 |
| 8 | | 10 | | 24 | 86 | 275 |

TABLE 5

Reactivity Profile:
Urea-modified Domtar Lignin (20 wt. %)
(lignin-polyol mixture prepared at 25° C.)

| Entry | HB-230, % | NPE, pph | lignin:urea:HCHO wt. ratio | Cream time, s | Gel-string time, s | Tack-free time, s |
|---|---|---|---|---|---|---|
| 1 | | | 1.0:2.0:0.74 | 25 | 69 | 105 |
| 2 | | 10 | | 18 | 50 | 98 |
| 3 | 20 | | | 20 | 54 | 106 |
| 4 | 20 | 10 | | 18 | 48 | 96 |
| 5 | | | 1.0:1.5:0.56 | 19 | 43 | 74 |
| 6 | | 10 | | 19 | 42 | 72 |
| 7 | 20 | | | 19 | 42 | 71 |
| 8 | 20 | 10 | | 18 | 42 | 70 |
| 9 | 20 | 10 | | 19 | 41 | 71 |
| 10 | | | 1.0:1.0:037 | 20 | 57 | 101 |
| 11 | | 10 | | 18 | 48 | 95 |
| 12 | 20 | | | 21 | 51 | 98 |

TABLE 6

Reactivity Profile:
Diethanolamine-modified Domtar Lignin (20 wt. %)
(lignin-polyol mixture prepared at 130° C.)

| Entry | HB-230, % | lignin:urea:HCHO wt. ratio | Foam quality | Cream time, s | Gel-string time, s | Tack-free time, s |
|---|---|---|---|---|---|---|
| 1 | | 1.0:1.2:1.2 | larger cells | 30 | 118 | 205 |
| 2 | 20 | | | 25 | 94 | 170 |

TABLE 6-continued

Reactivity Profile:
Diethanolamine-modified Domtar Lignin (20 wt. %)
(lignin-polyol mixture prepared at 130° C.)

| Entry | HB-230, % | lignin:urea:HCHO wt. ratio | Foam quality | Cream time, s | Gel-string time, s | Tack-free time, s |
|---|---|---|---|---|---|---|
| 3 | | 1.0:1.8:1.2 | finer | 31 | 80 | 105 |
| 4 | 20 | | structure | 28 | 72 | 96 |

TABLE 7

Reactivity Profile and Foam Properties:
Control (non-lignin) Foams

| | Composition | | | | | Reactivity | | | Property | | |
|---|---|---|---|---|---|---|---|---|---|---|---|
| Entry | Lignin, pph | TCPP, pph | TOP, pph | HB-230, pph | Cu, mmol | Cream time, s | Gel-string time, s | Tack-free time, s | Density, pcf | Compress. Str., psi | Mass loss, % |
| 1 | 0 | | | | | 21 | 52 | 72 | 1.72 | 34 | 55 |
| 2 | 0 | 20 | | | | 21 | 50 | 73 | 1.84 | 36 | 4.1 |
| 3* | 0 | 20 | | | | 24 | 52 | 72 | 1.91 | 40 | 8.3 |
| 4 | 0 | | 20 | | | 22 | 49 | 75 | 1.84 | 33 | 29 |
| 5 | 0 | | | 20 | | 22 | 48 | 74 | 1.78 | 32 | 57 |
| 6 | 0 | 20 | | 20 | | 22 | 45 | 75 | 1.84 | 33 | 3.8 |
| 7 | 0 | | | | 3.2 | 22 | 53 | 73 | 1.88 | 39 | 22 |
| 8 | 0 | | | 20 | 3.2 | 25 | 51 | 82 | 1.75 | 38 | 19 |
| 9 | 0 | | 20 | | 3.2 | 25 | 51 | 81 | 1.91 | 40 | 14 |
| 10 | 0 | | 20 | 20 | 3.2 | 25 | 50 | 73 | 2.00 | 38 | 12 |

*sample aged 3 months.

TABLE 8

Reactivity Profile and Foam Properties:
Urea-modified Domtar Lignin (20-40 wt. %)-Waste-Generating Process

| | Composition | | | | | | Reactivity | | | Property | | |
|---|---|---|---|---|---|---|---|---|---|---|---|---|
| Entry | Lignin, pph | TCPP, pph | TOP, pph | HB-230, pph | HB-395, pph | Cu, mmol/g[1] | Cream time, s | Gel-string time, s | Tack-free time, s | Density, pcf | Compress. Str., psi | Mass loss, % |
| 1 | 20 | | | | | | 22 | 54 | 80 | 1.73 | 26 | 32 |
| 2 | 20 | 20 | | | | | 22 | 54 | 79 | 1.88 | 33 | 3.3 |
| 3 | 20 | | 20 | | | | 22 | 53 | 76 | 1.85 | 30 | 6.6 |
| 4 | 20 | | | 20 | | | 21 | 52 | 76 | 1.73 | 28 | 40 |
| 5 | 20 | 20 | | 20 | | | 22 | 54 | 78 | 1.77 | 27 | 2.8 |
| 6 | 20 | | 20 | 20 | | | 22 | 54 | 80 | 1.93 | 29 | 6.0 |
| 7 | 30 | | | | | | 22 | 62 | 86 | 1.84 | 27 | 40 |
| 8 | 40 | | | | | | 22 | 71 | 102 | 1.73 | 23 | 39 |
| 9 | 30 | | | 20 | | | 28 | 68 | 98 | 1.82 | 27 | 20 |
| 10 | 30 | | 20 | 20 | | | 30 | 69 | 110 | 1.97 | 28 | 8.3 |
| 11 | 20 | | | | | 0.32 | 30 | 66 | 88 | 1.88 | 32 | 17 |
| 12 | 20 | 20 | 20 | | | 0.22 | 23 | 56 | 85 | 2.10 | 34 | 4.0 |
| 13 | 20 | 20 | 20 | | | 0.32 | 28 | 64 | 86 | 2.12 | 33 | 4.3 |
| 14 | 20 | | | 20 | | 0.32 | 29 | 65 | 88 | 2.06 | 33 | 20 |
| 15 | 20 | | | | 20 | 0.32 | 28 | 58 | 84 | 2.06 | 37 | 15 |
| 16 | 20 | 20 | | | 20 | 0.32 | 29 | 60 | 82 | 1.95 | 32 | 3.6 |
| 17 | 20 | 20 | | | | 0.32 | 28 | 59 | 83 | 1.98 | 32 | 10 |
| 18 | 20 | | | | 20 | | 23 | 46 | 82 | 1.91 | 33 | 20 |
| 19* | 20 | | | | | 0.44 | 22 | 55 | 77 | 1.98 | 37 | 18 |
| 20* | 30 | | | | | 0.44 | 28 | 62 | 84 | 2.00 | 33 | 15 |
| 21* | 40 | | | | | 0.44 | 30 | 68 | 98 | 2.08 | 33 | 11 |

[1]mmol Cu per g of modified lignin.
*includes 0.84 mmol P/g modified lignin

TABLE 9

Viscosity v. Temperature of 20% Modified Lignin-Polyol Mixtures

| Temperature (° F.) | Viscosity (cP) |
|---|---|
| 42 | 15,900 |
| 50 | 9,600 |
| 60 | 5,300 |
| 70 | 2,800 |
| 77 | 1,900 |
| 90 | 1,100 |
| 100 | 700 |
| 110 | 600 |
| 121 | 400 |
| 142 | 300 |

TABLE 10

Effect of Modified Lignin on Rigid Foam R-Values

| | Composition | | | | Property | R-Values | | |
|---|---|---|---|---|---|---|---|---|
| Entry | Lignin, pph | TOP, pph | HB-230, pph | Cu, mmol[1] | Density, pcf | 75° F. | 40° F. | 25° F. |
| 1 | 20 | | | | 1.92 | 6.2 | 6.0 | 5.8 |
| 2 | 20 | 20 | 20 | 0.22 | 1.91 | 5.9 | 6.5 | 6.7 |
| 3 (control) | | | | | 1.88 | 6.3 | 6.3 | 6.1 |

[1] mmol Cu per g of modified lignin.

TABLE 11

Reactivity Profile and Foam Properties: Urea-modified Domtar Lignin-Zero-Waste Process

| | Composition | | | | | | Reactivity | | | Property | | |
|---|---|---|---|---|---|---|---|---|---|---|---|---|
| Entry | Lignin, pph | HB-230, pph | HB-395, pph | TOP, pph | NPE, pph | Cu, mmol[1] | Cream time, s | Gel-string time, s | Tack-free time, s | Density, pcf | Compress. Str., psi | Mass loss, % |
| 1 | 20 | | | | 6 | | 20 | 42 | 58 | 1.90 | 35 | 17 |
| 2 | 20 | 20 | | | 6 | | 20 | 41 | 56 | 1.88 | 33 | 24 |
| 3 | 20 | | 20 | | 6 | | 20 | 42 | 56 | 1.89 | 37 | 19 |
| 4 | 30 | | | | 6 | | 22 | 46 | 64 | 1.88 | 34 | 18 |
| 5 | 30 | 20 | | | 6 | | 22 | 45 | 64 | 1.89 | 32 | 20 |
| 6 | 40 | | | | 6 | | 22 | 48 | 68 | 1.84 | 30 | 14 |
| 7 | 50 | | | | 6 | | 22 | 54 | 78 | 1.85 | 28 | 22 |
| 8 | 55 | | | | 10 | | 21 | 56 | 90 | 1.77 | 20 | 20 |
| 9 | 60 | | | | 10 | | 22 | 64 | 100 | 1.84 | 12 | 37 |
| 10 | 20 | | | 20 | 6 | 0.3 | 19 | 40 | 56 | 1.83 | 29 | 9.9 |
| 11 | 20 | | | 20 | 6 | | 19 | 41 | 58 | 1.82 | 29 | 10 |
| 12 | 20 | | 20 | 20 | 6 | 0.3 | 20 | 42 | 61 | 1.93 | 32 | 9.0 |
| 13 | 20 | | 20 | 10 | 6 | 0.3 | 22 | 44 | 63 | 1.89 | 32 | 12 |
| 14[3] | 20 | | 20 | 20 | 6 | 0.3 | 13 | 32 | 48 | 1.89 | 33 | 14 |
| 15 | 20 | | 20 | | 6 | 0.3 | 20 | 45 | 62 | 1.81 | 34 | 20 |
| 16 | 20 | 20 | | 20 | 6 | 0.3 | 22 | 45 | 62 | 1.99 | 31 | 9.6 |
| 17 | 20 | | 20 | 20 | 6 | 0.3[2] | 20 | 44 | 64 | 1.81 | 31 | 9.1 |

[1] mmol Cu per g of modified lignin. $CuSO_4 \cdot 5H_2O$ used during lignin modification unless otherwise indicated.
[2] $CuSO_4 \cdot 5H_2O$ included in the polyol mixture
[3] PEG-300 (20 pph) used instead of DPG (20 pph).

TABLE 12

Reactivity Profile and Foam Properties: Urea-modified Suzano Lignin-Zero-Waste Process

| | Composition | | | | | | Reactivity | | | Property | | |
|---|---|---|---|---|---|---|---|---|---|---|---|---|
| Entry | Lignin, pph | HB-230, pph | HB-395, pph | TOP, pph | NPE, pph | Cu, mmol[1] | Cream time, s | Gel-string time, s | Tack-free time, s | Density, pcf | Compress. Str., psi | Mass loss, % |
| 1 | 20 | | | | | | 22 | 48 | 70 | 1.81 | 31 | 19 |
| 2 | 20 | 20 | | | | | 22 | 45 | 64 | 1.85 | 26 | 22 |
| 3 | 20 | | 20 | | | | 23 | 48 | 68 | 1.86 | 32 | 20 |

TABLE 12-continued

Reactivity Profile and Foam Properties:
Urea-modified Suzano Lignin-Zero-Waste Process

| | Composition | | | | | | Reactivity | | | Property | | |
|---|---|---|---|---|---|---|---|---|---|---|---|---|
| Entry | Lignin, pph | HB-230, pph | HB-395, pph | TOP, pph | NPE, pph | Cu, mmol[1] | Cream time, s | Gel-string time, s | Tack-free time, s | Density, pcf | Compress. Str., psi | Mass loss, % |
| 4 | 30 | | | | | | 25 | 52 | 75 | 1.75 | 27 | 24 |
| 5 | 30 | 20 | | | | | 27 | 55 | 85 | 1.89 | 28 | 27 |
| 6 | 30 | | 20 | | | | 28 | 56 | 87 | 1.78 | 27 | 24 |
| 7 | 40 | | | | 6 | | 27 | 65 | 94 | 1.77 | 26 | 29 |
| 8 | 50 | | | | 6 | | 25 | 85 | 120 | 1.75 | 19 | 33 |
| 9 | 20 | | | | 6 | 0.3 | 24 | 60 | 84 | 1.74 | 27 | 20 |
| 10 | 20 | | 20 | | 6 | | 22 | 52 | 68 | 1.90 | 34 | 19 |
| 11 | 20 | | 20 | | 6 | 0.3 | 22 | 53 | 69 | 1.84 | 32 | 19 |
| 12 | 20 | | 20 | 20 | 6 | 0.3 | 25 | 58 | 85 | 2.05 | 32 | 8.7 |
| 13 | 20 | | 20 | 10 | 6 | 0.3 | 25 | 57 | 74 | 1.85 | 29 | 16 |
| 14 | 20 | | 20 | 20 | 6 | 0.3[2] | 23 | 53 | 66 | 1.95 | 32 | 14 |
| 15 | 20 | | 20 | | 6 | 0.3[3] | 23 | 54 | 68 | 1.82 | 29 | 23 |
| 16 | 20 | | | | 6 | 0.3 | 25 | 61 | 88 | 1.65 | 24 | 28 |
| 17 | 20 | | 20 | 20 | 6 | | 25 | 52 | 66 | 1.94 | 32 | 11 |
| 18[5] | 20 | | 20 | 20 | 6 | 0.3 | 21 | 43 | 61 | 1.89 | 27 | 15 |
| 19 | 20 | 20 | | 20 | 6 | 0.3 | 26 | 60 | 78 | 1.83 | 25 | 9.8 |
| 20 | 20 | 20 | | 20 | 6 | 0.3[4] | 25 | 54 | 76 | 2.00 | 30 | 8.9 |

[1]mmol Cu per g of modified lignin. $CuSO_4 \cdot 5H_2O$ used during lignin modification unless otherwise indicated.
[2]$Cu_2O$.
[3]$Cu_3(PO_4)_2$.
[4]$CuSO_4 \cdot 5H_2O$ added during lignin modification.
[5]PEG-300 (20 pph) used instead of DPG (20 pph).

TABLE 13

Reactivity Profile and Foam Properties:
Urea-modified Indulin AT Lignin-Zero-Waste Process

| | Composition | | | | | | Reactivity | | | Property | | |
|---|---|---|---|---|---|---|---|---|---|---|---|---|
| Entry | Lignin, pph | HB-230, pph | HB-395, pph | TOP, pph | NPE, pph | Cu, mmol[1] | Cream time, s | Gel-string time, s | Tack-free time, s | Density, pcf | Compress. Str., psi | Mass loss, % |
| 1 | 20 | | | | 6 | | 20 | 42 | 58 | 1.82 | 34 | 18 |
| 2 | 20 | 20 | | | 6 | | 20 | 40 | 57 | 1.87 | 34 | 20 |
| 3 | 20 | | 20 | | 6 | | 19 | 41 | 55 | 1.95 | 38 | 21 |
| 4 | 30 | | | | 6 | | 20 | 46 | 61 | 1.86 | 28 | 20 |
| 5 | 30 | 20 | | | 6 | | 20 | 43 | 58 | 1.90 | 32 | 14 |
| 6 | 30 | | 20 | | 6 | | 20 | 42 | 56 | 1.99 | 37 | 18 |
| 7 | 20 | | 20 | 20 | 6 | 0.3[1] | 20 | 41 | 54 | 2.06 | 36 | 7.8 |
| 8 | 20 | | 20 | | 6 | 0.3[2] | 19 | 40 | 54 | 2.05 | 38 | 18 |
| 9 | 40 | | | | 6 | | 20 | 46 | 65 | 1.99 | 31 | 21 |
| 10 | 50 | | | | 10 | | 20 | 58 | 78 | 1.81 | 25 | 32 |
| 11 | 60 | | | | 10 | | 20 | 59 | 82 | 1.94 | 26 | 24 |
| 12 | 20 | 20 | | 20 | 6 | 0.3[3] | 20 | 50 | 70 | 2.02 | 31 | 12 |
| 13 | 20 | | 20 | 20 | 6 | 0.3[3] | 21 | 50 | 68 | 2.00 | 35 | 7.8 |

[1]mmol Cu per g of modified lignin.
[1]$Cu_2O$.
[2]$Cu_3(PO_4)_2$.
[3]$CuSO_4 \cdot 5H_2O$ added during lignin modification.

TABLE 14

Reactivity Profile, Foam Properties, and R-Values:
Urea-modified Indulin AT Lignin-Zero-Waste Process

| | Composition | | | | | Reactivity | | | Property | | | |
|---|---|---|---|---|---|---|---|---|---|---|---|---|
| Entry | Lignin, pph | HB-230, pph | HB-395, pph | FR, pph | Cu, mmol[1] | Cream time, s | Gel-string time, s | Tack-free time, s | Density, pcf | Compress. Str., psi | Mass loss, % | R-val[4] (75/40/25) |
| 1 | 0 | 0 | 0 | 0 | 0 | 11 | 27 | 50 | 1.65 | 39 | 59 | 5.9, 5.9, 5.7 |
| 2 | 0 | 0 | 0 | TCPP[2], 20 | 0 | 12 | 27 | 52 | 1.67 | 38 | 10 | — |
| 3 | 20 | 0 | 0 | 0 | 0 | 10 | 31 | 58 | 1.65 | 30 | 34 | 5.9, 5.9, 5.6 |
| 4 | 20 | 20 | 0 | TMP[3], 20 | 0.30 | 10 | 22 | 36 | 1.74 | 30 | 3.0 | 5.7, 6.1, 6.0 |
| 5 | 20 | 0 | 20 | TMP[3], 20 | 0.44 | 11 | 23 | 42 | 1.72 | 34 | 3.6 | — |

Formulation: polyol components: STEPANPOL ® P2352 (20-80 pph), PEG-300 (20 pph), modified lignin (0-20 pph), HONEY BEE ™ HB-230 or HB-395 (0-20 pph); 300 index.
[1]mmol Cu per g of modified lignin.
[2]tris(2-chloroisopropyl)phosphate
[3]trimethylphosphate
[4]R-values measured at 75° F., 40° F., and 25° F.

The preceding examples are meant only as illustrations; the following claims define the scope of the invention.

We claim:

1. A process comprising:
 (a) heating a lignin source with an amide nitrogen source and a starved concentration of a $C_1$-$C_5$ aldehyde in the presence of an acidic or basic catalyst at a mass ratio of lignin source to nitrogen source within the range of 1:1 to 1:5 and at a molar ratio of nitrogen source to $C_1$-$C_5$ aldehyde within the range of 3.5:1 to 1:1 to give a reaction mixture comprising a Mannich condensation product;
 (b) neutralizing the reaction mixture from step (a) to give a neutralized reaction mixture; and
 (c) isolating a modified lignin product from the neutralized reaction mixture.

2. The process of claim 1 wherein the modified lignin product is isolated by filtration.

3. The process of claim 1 wherein the modified lignin product is isolated by concentrating the neutralized reaction mixture.

4. The process of claim 1 wherein lignin source is selected from the group consisting of softwood kraft lignins, hardwood kraft lignins, lignosulfonates, organosolv lignins, steam-explosion lignins, bagasse, non-wood cellulosic biomass, other natural waste materials containing enolizable hydrogen atoms, and combinations thereof.

5. The process of claim 4 wherein the lignin source is a softwood kraft lignin.

6. The process of claim 1 wherein the heating in step (a) is at a temperature within the range of 40° C. to 130° C.

7. The process of claim 1 wherein the basic catalyst is an alkali metal hydroxide or an alkaline earth metal hydroxide.

8. The process of claim 1 wherein the mass ratio of the lignin source to the nitrogen source is within the range of 1:1 to 1:3, and the molar ratio of the nitrogen source to the $C_1$-$C_5$ aldehyde is within the range of 2.5:1 to 1:1.

9. The process of claim 1 wherein the $C_1$-$C_5$ aldehyde is formaldehyde.

10. A process comprising:
 (a) heating a lignin source with a urea nitrogen source and a starved concentration of a $C_1$-$C_5$ aldehyde in the presence of an acidic or basic catalyst at a mass ratio of lignin source to nitrogen source within the range of 1:1 to 1:5 and at a molar ratio of nitrogen source to $C_1$-$C_5$ aldehyde within the range of 3.5:1 to 1:1 to give a reaction mixture comprising a Mannich condensation product;
 (b) neutralizing the reaction mixture from step (a) to give a neutralized reaction mixture; and
 (c) isolating a modified lignin product from the neutralized reaction mixture.

11. A process comprising:
 (a) heating a lignin source with a urea nitrogen source and a starved concentration of formaldehyde in the presence of an acidic or basic catalyst at a mass ratio of lignin source to nitrogen source within the range of 1:1 to 1:5 and at a molar ratio of nitrogen source to $C_1$-$C_5$ aldehyde within the range of 3.5:1 to 1:1 to give a reaction mixture comprising a Mannich condensation product;
 (b) neutralizing the reaction mixture from step (a) to give a neutralized reaction mixture; and
 (c) isolating a modified lignin product from the neutralized reaction mixture
 wherein the mass ratio of lignin source to urea to formaldehyde is about 1.0 to about 1.2 to about 0.56.

12. The process of claim 1 wherein the aldehyde is a $C_2$-$C_5$ aldehyde.

* * * * *